(12) United States Patent
Asakura et al.

(10) Patent No.: US 11,271,913 B2
(45) Date of Patent: Mar. 8, 2022

(54) COMMUNICATION SYSTEM, COMMUNICATION DEVICE, AND NON-TRANSITORY COMPUTER-READABLE RECORDING MEDIUM STORING COMPUTER-READABLE INSTRUCTIONS FOR TERMINAL DEVICE

(71) Applicant: Brother Kogyo Kabushiki Kaisha, Nagoya (JP)

(72) Inventors: Hirotaka Asakura, Nagoya (JP); Takeshi Nagasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 470 days.

(21) Appl. No.: 16/269,160

(22) Filed: Feb. 6, 2019

(65) Prior Publication Data
US 2019/0253401 A1 Aug. 15, 2019

(30) Foreign Application Priority Data

Feb. 9, 2018 (JP) .............................. JP2018-022138

(51) Int. Cl.
*H04L 29/06* (2006.01)
*H04L 9/32* (2006.01)
*G06F 3/12* (2006.01)

(52) U.S. Cl.
CPC ........ *H04L 63/0492* (2013.01); *G06F 3/1222* (2013.01); *G06F 3/1238* (2013.01);
(Continued)

(58) Field of Classification Search
CPC ............. H04L 63/0492; H04L 63/0807; H04L 63/0853; H04L 63/0892; H04L 9/3213;
(Continued)

(56) References Cited

U.S. PATENT DOCUMENTS

| 9,232,395 | B2 | 1/2016 | Matsuda |
| 10,546,105 | B1 * | 1/2020 | Posillico ................. G06F 21/10 |

(Continued)

FOREIGN PATENT DOCUMENTS

| JP | 2014-071730 A | 4/2014 |
| JP | 2017-157104 A | 9/2017 |
| WO | 2015/047033 A1 | 4/2015 |

OTHER PUBLICATIONS

Wi-Fi Alliance Technical Committee P2P Task Group, "Wi-Fi Peer-to Peer (P2P) Technical Specification", Version 1.1, pp. 1-159, 2010.

(Continued)

*Primary Examiner* — Mohammad W Reza
(74) *Attorney, Agent, or Firm* — Banner & Witcoff, Ltd.

(57) ABSTRACT

A terminal device may execute a communication of authentication information with a communication device, the authentication information being prepared by the terminal device or the communication device without being inputted in the terminal device or the communication device by a user; send the authentication information to a first sever; and send specific information to the first server. The communication device may execute the communication of the authentication information with the terminal device; and send the authentication information to the first server. The first server may register the service information in the memory of the first server in a case where the authentication information is received from both of the terminal device and the communication device, and the specific information is received from the terminal device.

17 Claims, 10 Drawing Sheets

(52) U.S. Cl.
CPC .......... *H04L 9/3213* (2013.01); *H04L 9/3234* (2013.01); *H04L 63/0807* (2013.01); *H04L 63/0853* (2013.01); *H04L 63/0892* (2013.01); *H04L 2463/081* (2013.01); *H04L 2463/082* (2013.01)

(58) Field of Classification Search
CPC ............. H04L 9/3234; H04L 2463/081; H04L 2463/082; H04L 2209/80; H04L 9/3226; G06F 3/1238; G06F 3/1222; G06F 3/1236; G06F 3/1203; G06F 3/1231; G06F 3/1292; G06F 3/1288
See application file for complete search history.

(56) References Cited

U.S. PATENT DOCUMENTS

| | | | |
|---|---|---|---|
| 2008/0307517 A1* | 12/2008 | Grigoriev | ........... H04L 63/0428 726/9 |
| 2014/0096202 A1 | 4/2014 | Matsuda | |
| 2017/0257441 A1 | 9/2017 | Ohara | |
| 2018/0182021 A1* | 6/2018 | Sugamata | ............... H04L 67/22 |

OTHER PUBLICATIONS

Nov. 9, 2021—(JP) Notification of Reasons for Rejection—App 2018-022138, Eng Tran.

\* cited by examiner (Second Embodiment: Case D)

COMMUNICATION SYSTEM, COMMUNICATION DEVICE, AND NON-TRANSITORY COMPUTER-READABLE RECORDING MEDIUM STORING COMPUTER-READABLE INSTRUCTIONS FOR TERMINAL DEVICE

CROSS-REFERENCE

This application claims priority to Japanese Patent Application No. 2018-022138, filed on Feb. 9, 2018, the entire contents of which are incorporated herein by reference.

TECHNICAL FIELD

The present specification discloses a technique relating to a communication system comprising a terminal device, a communication device, and a first server.

BACKGROUND ART

A communication system provided with a terminal device, a printer, and a server, is known. The printer sends device information including a serial number of the printer to the server, and causes the server to store the device information. In response to user information and the serial number of the printer being inputted to the terminal device by the user after the device information has been stored in the server, the terminal device sends the user information and the serial number to the server. In a case where the received serial number and the serial number in the stored device information are identical, the server registers the device information, the user information, and an access token, and sends the access token to the terminal device. As a result, the access token is sent from the terminal device to the printer, and the printer executes communication with the server by using the received access token. Thereby, the server receives remaining consumable article amount information from the printer, and executes a consumable article shipping service.

SUMMARY

In the aforementioned system, the user must input the serial number to the terminal device in order to register the access token in the server.

The present specification discloses a technique enabling service information for receiving provision of a service related to a communication device to be registered easily in a server without inputting authentication information to a terminal device or the communication device.

The disclosure herein discloses a communication system comprising a terminal device, a communication device, and a first server. The terminal device may comprise: a processor; and a memory storing computer-readable instructions therein, the computer-readable instructions, when executed by the processor, causing the terminal device to: execute a communication of authentication information with the communication device, the authentication information being for registering service information in the first server and being prepared by the terminal device or the communication device without being inputted in the terminal device or the communication device by a user, the service information being for receiving a service related to the communication device from a second server; send the authentication information to the first sever; and send specific information to the first server, the communication device may comprise: a processor; and a memory storing computer-readable instructions therein, the computer-readable instructions, when executed by the processor, causing the communication device to: execute the communication of the authentication information with the terminal device; and send the authentication information to the first server, the first server may comprise: a processor; and a memory storing computer-readable instructions therein, the computer-readable instructions, when executed by the processor, causing the first server to: in a case where the authentication information is received from both of the terminal device and the communication device, and the specific information is received from the terminal device, register the service information in the memory of the first server, the service information including device identification information for identifying the communication device and the specific information.

The disclosure herein discloses a communication device. The communication device may comprise: a processor; and a memory storing computer-readable instructions therein, the computer-readable instructions, when executed by the processor, causing the communication device to: execute a communication of authentication information with a terminal device, the authentication information being for registering service information in a first server and being prepared by the terminal device or the communication device without being inputted in the terminal device or the communication device by a user, the service information being for receiving a service related to the communication device from a second server; send the authentication information to the first server, wherein in the first server, in a case where the authentication information is received from both of the terminal device and the communication device, and specific information is received from the terminal device, the service information is registered, the service information including device identification information for identifying the communication device and the specific information.

A computer program for implementing the above communication device, non-transitory computer-readable medium storing the computer program, and a method performed by the above communication device are also novel and useful.

The disclosure herein also discloses a non-transitory computer-readable recording medium storing computer-readable instructions for a terminal device. The computer-readable instructions, when executed by a processor of the terminal device, may cause the terminal device to: execute a communication of authentication information with a communication device, the authentication information being for registering service information in a first server and being prepared by the terminal device or the communication device without being inputted in the terminal device or the communication device by a user, the service information being for receiving a service related to the communication device from a second server; send the authentication information to the first sever; and send specific information to the first server, wherein in the first server, in a case where the authentication information is received from both of the terminal device and the communication device, and the specific information is received from the terminal device, the service information is registered, the service information including device identification information for identifying the communication device and the specific information.

The above terminal device itself and a method performed by the terminal device are also novel and useful. Further, the above first server itself, a computer program for implementing the first server, a non-transitory computer-readable recording medium storing the computer program, and a method performed by the first server are also novel and useful.

EMBODIMENTS

In the present embodiment, a communication system is disclosed comprising a mobile terminal, a printer, a mediation server mediating provision of a service for the printer, and a service providing server providing a shipping service for shipping a consumable article to be attached to the printer. In such a system, a technique is disclosed for registering, in the mediation server, service information for receiving provision of the shipping service. In order to facilitate understanding of the present embodiment, a first comparative example will be described with reference to FIG. 1 before describing the present embodiment.

Figure 1:
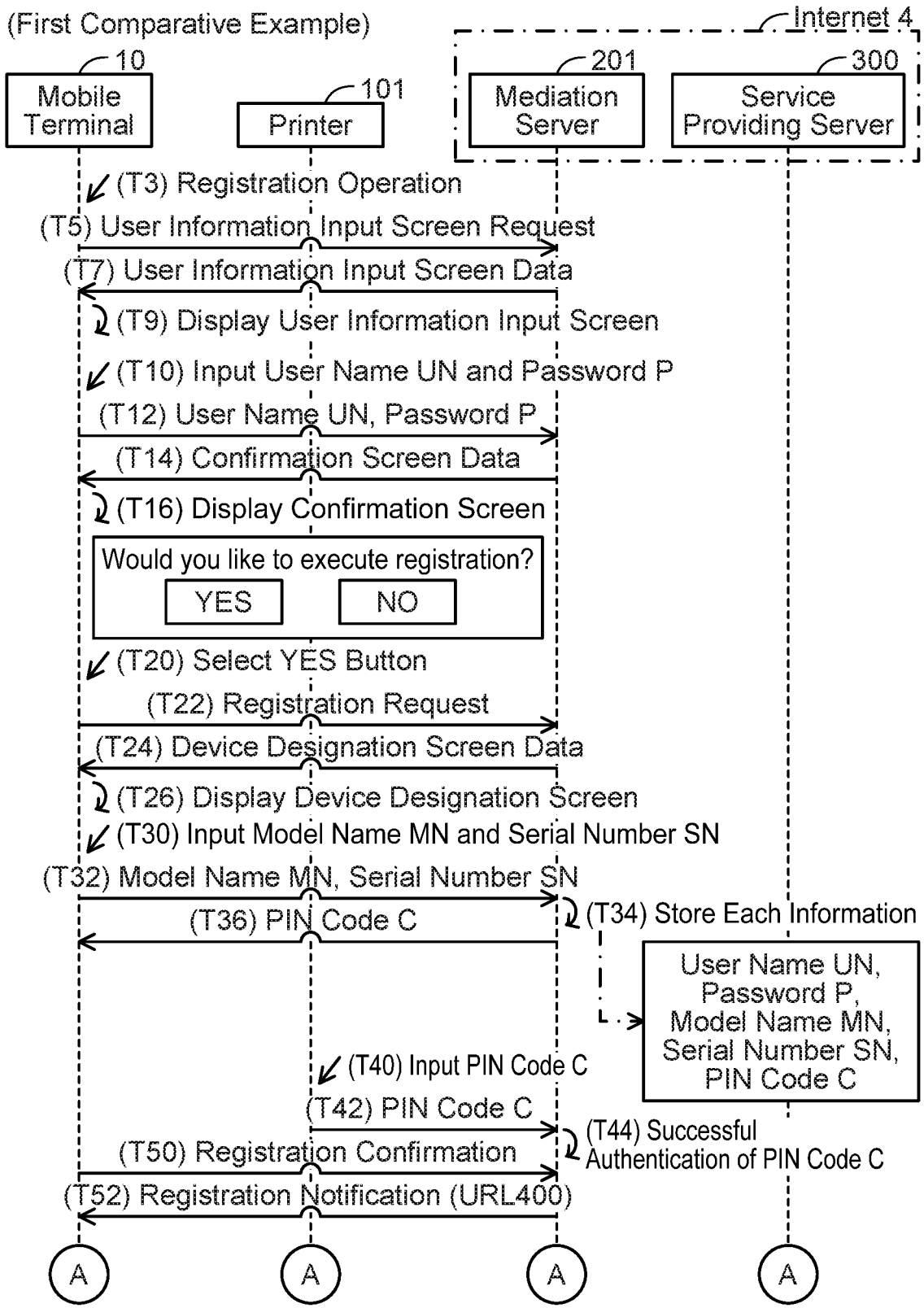
FIG. 1 shows a sequence diagram of a first comparative example.

(First Comparative Example; FIG. 1)

A communication system of the first comparative example is provided with a mobile terminal 10, a printer 101, a mediation server 201, and a service providing server 300. The mobile terminal 10 is a portable terminal device such as a mobile telephone (e.g., smartphone), PDA, notebook PC, tablet PC. The mediation server 201 and the service providing server 300 are located on Internet 4. The mobile terminal 10 is configured to communicate with the mediation server 201 and the service providing server 300 via the Internet 4. The printer 101 is configured to communicate with the mediation server 201 via the Internet 4.

In response to accepting a registration operation from the user for registering information of the printer 101 (e.g., model name of the printer 101, serial number for identifying the printer 101, etc.) in the mediation server 201 in T3, in T5 the mobile terminal 10 sends a user information input screen request for requesting sending of a user information input screen, to the mediation server 201.

In response to receiving the user information input screen request from the mobile terminal 10 in T5, in T7 the mediation server 201 sends, to the mobile terminal 10, user information input screen data representing the user information input screen for inputting user information. The user information includes a user name and a password.

In response to receiving the user information input screen data from the mediation server 201 in T7, in T9 the mobile terminal 10 displays the user information input screen represented by the user information input screen data. Next, in response to accepting input of a user name UN and a password P from the user in T10, in T12 the mobile terminal 10 sends the user name UN and the password P to the mediation server 201.

In response to receiving the user name UN and the password P from the mobile terminal 10 in T12, in T14 the mediation server 201 sends, to the mobile terminal 10, confirmation screen data representing a confirmation screen for confirming whether to register service information.

In response to receiving the confirmation screen data from the mediation server 201 in T14, in T16 the mobile terminal 10 displays the confirmation screen represented by the confirmation screen data. The confirmation screen includes a YES button indicating that the service information is to be registered, and a NO button indicating that the service information is not to be registered.

In response to the YES button in the confirmation screen being selected by the user in T20, in T22 the mobile terminal 10 sends a registration request requesting registration of the service information, to the mediation server 201.

In response to receiving the registration request from the mobile terminal 10 in T22, in T24 the mediation server 201 sends, to the mobile terminal 10, device designation screen data representing a device designation screen for designating a registration target printer.

In response to receiving the device designation screen data from the mediation server 201 in T24, in T26 the mobile terminal 10 displays the device designation screen represented by the device designation screen data. Next, in response to accepting input from the user of a model name MN and a serial number SN of the printer 101 in the device designation screen in T30, in T32 the mobile terminal 10 sends the model name MN and the serial number SN of the printer 101 to the mediation server 201.

In response to receiving the model name MN and the serial number SN from the mobile terminal 10 in T32, in T34 the mediation server 201 creates a PIN code C, and stores the user name UN, the password P, the model name MN, the serial number SN, and the PIN code C in association with one another. Then, in T36, the mediation server 201 sends the PIN code C to the mobile terminal 10.

In T36, the mobile terminal 10 displays the PIN code C in response to receiving the PIN code C from the mediation server 201. Thereby, a user can learn the PIN code C.

Thereafter, in response to accepting input of the PIN code C from the user in T40, in T42 the printer 101 sends the PIN code C to the mediation server 201.

In response to receiving the PIN code C from the printer 101 in T42, in T44 the mediation server 201 determines that the PIN code C has been stored (see T34), i.e., determines that authentication of the PIN code C succeeded.

In response to the model name MN and the serial number SN being sent to the mediation server 201 in T32, the mobile terminal 10 starts repeated sending of a registration confirmation to the mediation server 201. The registration confirmation is a signal for confirming that the information of the printer 101 has been registered in the mediation server 201. In FIG. 1, the registration confirmation is sent from the mobile terminal 10 to the mediation server 201 in T50.

In a case of receiving the registration confirmation from the mobile terminal 10 in T50 after the authentication of the PIN code C has succeeded, in T52 the mediation server 201 sends a registration notification to the mobile terminal 10 indicating that the information of the printer 101 has been registered. The registration notification includes a URL (abbreviation of Uniform Resource Locator) 400 indicating a location of the service providing server 300.

Figure 2:
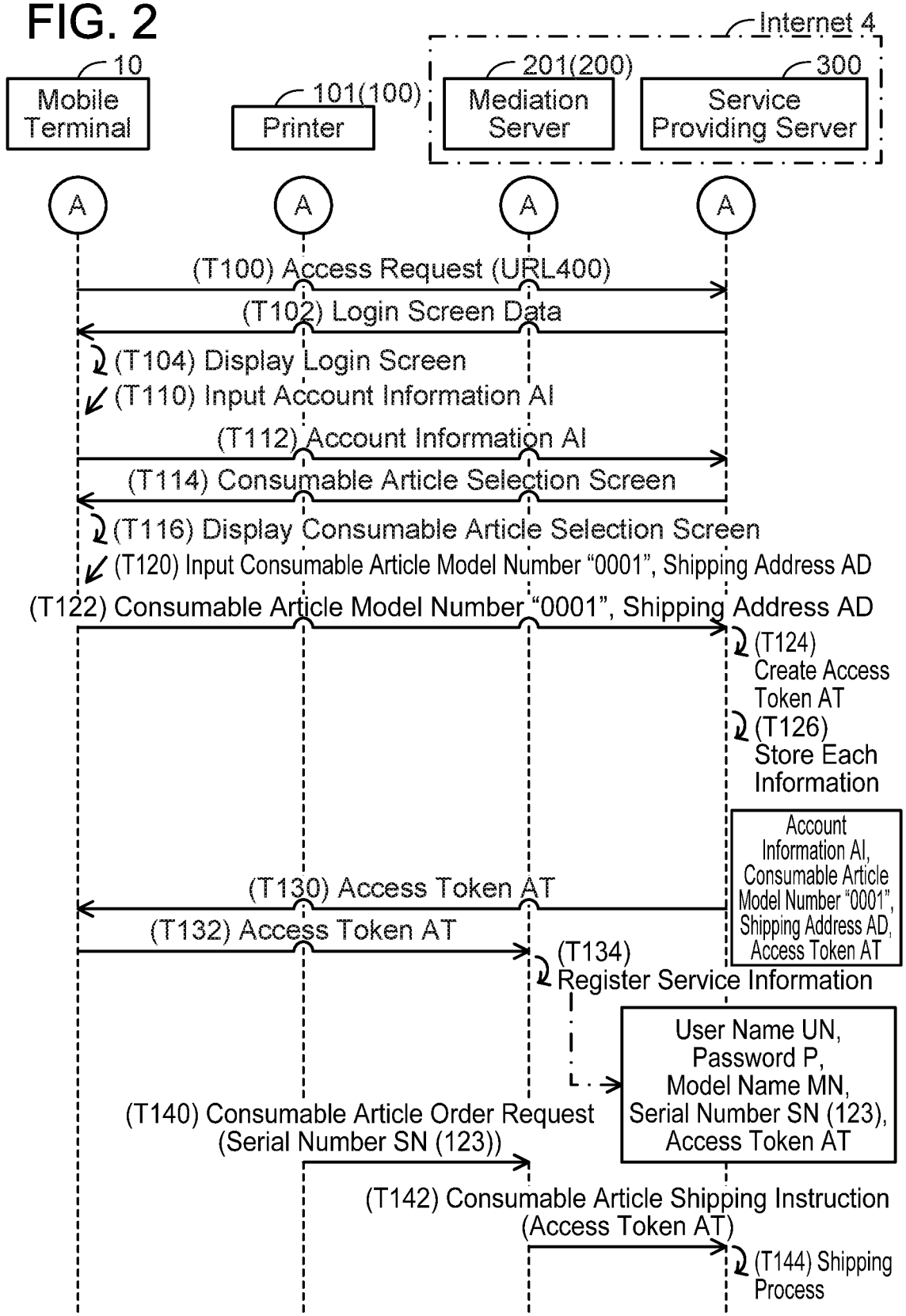
FIG. 2 shows a sequence diagram of a continuation of FIG. 1.

(Continuation of FIG. 1; FIG. 2)

Next, processing that is a continuation of FIG. 1 will be described with reference to FIG. 2. In T100, the mobile terminal 10 sends, to the service providing server 300, an access request including the URL 400 in the registration notification received from the mediation server 201 in T52 of FIG. 1.

In response to receiving the access request from the mobile terminal 10 in T100, in T102 the service providing server 300 sends, to the mobile terminal 10, login screen data representing a login screen for logging in to the service providing server 300.

In response to receiving the login screen data from the service providing server 300 in T102, in T104 the mobile terminal 10 displays the login screen represented by the login screen data. Next, in response to accepting input of account information AI in the login screen from the user in T110, in T112 the mobile terminal 10 sends the account information AI to the service providing server 300. The account information AI is information for logging in to the service providing server 300.

In response to receiving the account information AI from the mobile terminal 10 in T112, in T114 the service providing server 300 sends, to the mobile terminal 10, consumable article selection screen data representing a consumable article selection screen for selecting a consumable article that is the shipping target.

In response to receiving the consumable article selection screen data from the service providing server 300 in T114, in T116 the mobile terminal 10 displays the consumable article selection screen represented by the consumable article selection screen data. Next, in response to accepting input in T120, from the user, of selection of a model number "0001" of the consumable article to be attached to the printer 101, and a shipping address AD to which the consumable article having the selected model number is to be shipped, in T122 the mobile terminal 10 sends the consumable article model number "0001" and the shipping address AD to the service providing server 300.

In response to receiving the consumable article model number "0001" and the shipping address AD from the mobile terminal 10 in T122, in T124 the service providing server 300 creates an access token AT and, in T126, stores the account information AI currently logged in to the service providing server 300, the received consumable article model number "0001", the received shipping address AD, and the created access token AT, in association with one another. Then, in T130, the service providing server 300 sends the access token AT to the mobile terminal 10. The access token AT is information for executing communication with the service providing server 300 in order to mediate provision of the shipping service.

In response to receiving the access token AT from the service providing server 300 in T130, in T132 the mobile terminal 10 sends the access token AT to the mediation server 201.

In response to receiving the access token AT from the mobile terminal 10 in T132, in T134 the mediation server 201 registers service information. The service information is information from the service providing server 300 for receiving provision of the shipping service for the printer 101 and, specifically, includes the user name UN, the password P, the model name MN, the serial number SN (see T34 of FIG. 1), and the access token AT. When the service information has been registered in T134, the mediation server 201 can use the service information to mediate provision of the shipping service for the printer 101.

In a case of accepting a predetermined operation from the user in response to the remaining amount of the consumable article currently attached to the printer 101 becoming small, in T140 the printer 101 sends, to the mediation server 201, a consumable article order request that includes the serial number SN of the printer 101.

In response to receiving the consumable article order request from the printer 101 in T140, in T142 the mediation server 201 specifies the access token AT associated with the serial number SN in the consumable article order request (see T134), and sends a consumable article shipping instruction including the access token AT to the service providing server 300.

In response to receiving the consumable article shipping instruction from the mediation server 201 in T142, in T144 the service providing server 300 specifies the consumable article model number "0001" and the shipping address AD associated with the access token AT in the consumable article shipping instruction (see T126), and executes the shipping process for shipping the consumable article having the model number "0001" to the shipping address AD.

As described above, in the first comparative example, in order to register the service information in the mediation server 201 (T134), the user must input the model name MN and the serial number SN of the printer 101 into the device designation screen (T30 of FIG. 1), and then must input the PIN code C to the printer 101 (T40). In the present embodiment described below, by making these input operations unnecessary, easy registration of the service information by the user in the mediation server is realized.

Figure 3:
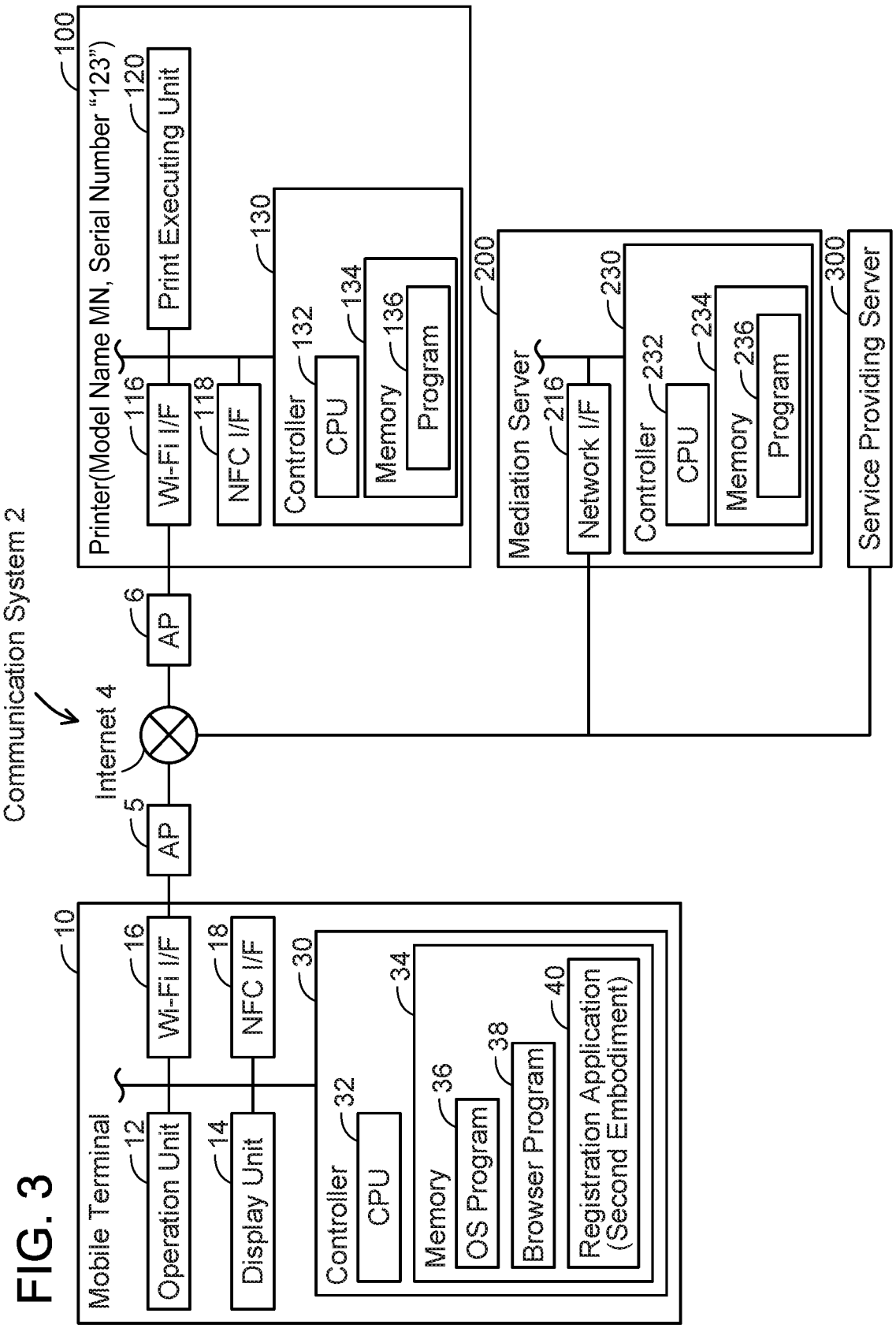
FIG. 3 shows a configuration of a communication system.

(Configuration of Communication System 2; FIG. 3)

Next, a communication system 2 of the present embodiment will be described with reference to FIG. 3. The communication system 2 comprises a mobile terminal 10, a printer 100, a mediation server 200, and a service providing server 300. In a state of FIG. 3, the devices 10, 100 are connected to a LAN (abbreviation of Local Area Network). Further, the servers 200, 300 are located on the Internet 4.

(Configuration of Mobile Terminal 10)

The mobile terminal 10 comprises an operation unit 12, a display unit 14, a Wi-Fi interface 16, an NFC interface 18, and a controller 30. The units 12 to 30 are connected to a bus line (reference number omitted). Below, interface is written as "I/F".

The operation unit 12 comprises a plurality of keys. A user can input various instructions to the mobile terminal 10 by operating the operation unit 12. The display unit 14 is a display for displaying various types of information.

The Wi-Fi I/F 16 is a wireless interface for executing Wi-Fi communication according to the Wi-Fi scheme. The Wi-Fi scheme is a wireless communication scheme for executing the Wi-Fi communication based on e.g., IEEE (abbreviation of The Institute of Electrical and Electronics Engineers, Inc.) standard 802.11 and standards conforming thereto (e.g., 802.11a, 11b, 11g, 11n, etc.). The Wi-Fi I/F 16 supports, in particular, the WFD scheme formulated by the Wi-Fi Alliance, and is configured to execute wireless communication according to the WFD scheme. That is, the mobile terminal 10 is a WFD apparatus. The WFD scheme is a wireless communication scheme described in the standard document "Wi-Fi Peer-to-Peer (P2P) Technical Specification Version 1.1" created by the Wi-Fi Alliance. According to the WFD standard, three states are defined as states of the WFD apparatus: Group Owner state (called "G/O state"

below), Client state, and device state. The WFD apparatus is configured to selectively operate in one of the above three states.

The mobile terminal 10 is connected via the Wi-Fi I/F 16 to a LAN formed by an AP (abbreviation of Access Point) 5. The AP 5 enables an Internet relay function that relays communication between a device in the LAN (e.g., the mobile terminal 10) and the Internet 4. Consequently, the mobile terminal 10 is configured to communicate via the AP 5 with a server (e.g., 200) on the Internet 4.

The NFC I/F 18 is an I/F for executing NFC communication according to the NFC scheme. The NFC scheme is a wireless communication scheme based on an international standard, such as e.g., ISO/IEC14443, 15693, 18092.

Here, differences between the Wi-Fi communication and the NFC communication will be described. A communication speed of the Wi-Fi communication (e.g., maximum communication speed is 11 to 600 Mbps) is faster than a communication speed of the NFC communication (e.g., maximum communication speed is 100 to 424 Kbps). Further, a frequency of a carrier wave (e.g. a 2.4 GHz band or 5.0 GHz band) in the Wi-Fi communication is different from a frequency of a carrier wave (e.g. a 13.56 MHz band) in the NFC communication. Further, a maximum distance at which the Wi-Fi communication can be executed (e.g., about 100 m at maximum) is greater than a maximum distance at which the NFC communication can be executed (e.g., about 10 cm at maximum).

The controller 30 comprises a CPU 32 and a memory 34. The CPU 32 executes various processes in accordance with programs 36, 38 stored in the memory 34. The memory 34 is configured by a volatile memory, a non-volatile memory, and the like. The memory 34 stores not only the OS (abbreviation of Operating System) program 36 for realizing basic operations of the mobile terminal 10, but also the browser program 38. The browser program 38 is a general-purpose data browsing software such as, e.g., IE (abbreviation of Internet Explorer (registered trademark)), Safari (registered trademark), and Google Chrome (registered trademark).

(Configuration of Printer 100)

The printer 100 is a peripheral device (e.g., a peripheral device of the mobile terminal 10) configured to execute a print function. The printer 100 has a model name MN and a serial number "123". The printer 100 comprises a Wi-Fi I/F 116, an NFC I/F 118, a print executing unit 120, and a controller 130. The units 116 to 130 are connected to a bus line (reference number omitted). The Wi-Fi I/F 116, the NFC I/F 118 are the same as the Wi-Fi I/F 16, the NFC I/F 18 of the mobile terminal 10, respectively. The print executing unit 120 comprises a printing mechanism that employs an ink jet scheme or a laser scheme.

The controller 130 comprises a CPU 132 and a memory 134. The CPU 132 executes various processes in accordance with a program 136 stored in memory 134. The memory 134 is configured by a volatile memory, a non-volatile memory, and the like.

In the state of FIG. 3, the printer 100 is connected via the Wi-Fi I/F 116 to a LAN formed by an AP 6 different from the AP 5. The AP 6 enables an Internet relay function that relays communication between a device in the LAN (e.g., the printer 100) and the Internet 4. Consequently, the printer 100 is configured to communicate via the AP 6 with a server (e.g., 200) on the Internet 4. However, the printer 100 can be in a state of not being connected to the AP 6 (a so-called link-down state). In this case, the printer 100 cannot communicate with the server on the Internet 4. Further, the printer 100 can be connected to the AP 6 (a so-called link-up state), but the Internet relay function of the AP 6 can be disabled, and a malfunction may occur in the Internet relay function of the AP 6. In this case, the printer 100 cannot communicate with the server on the Internet 4.

(Configuration of Mediation Server 200)

The mediation server 200 is a server for mediating provision of a shipping service of a consumable article executed by the service providing server 300, and is provided by a vendor of the printer 100. Moreover, in a variant, the mediation server 200 may be provided by a business different from the vendor of the printer 100. The mediation server 200 comprises a network I/F 216 and a controller 230. The units 216 and 230 are connected to a bus line (reference number omitted). The network I/F 216 is connected to the Internet 4.

The controller 230 comprises a CPU 232 and a memory 234. The CPU 232 executes various processes in accordance with a program 236 stored in the memory 234. The memory 234 is configured by a volatile memory, a non-volatile memory, and the like.

Figure 4:
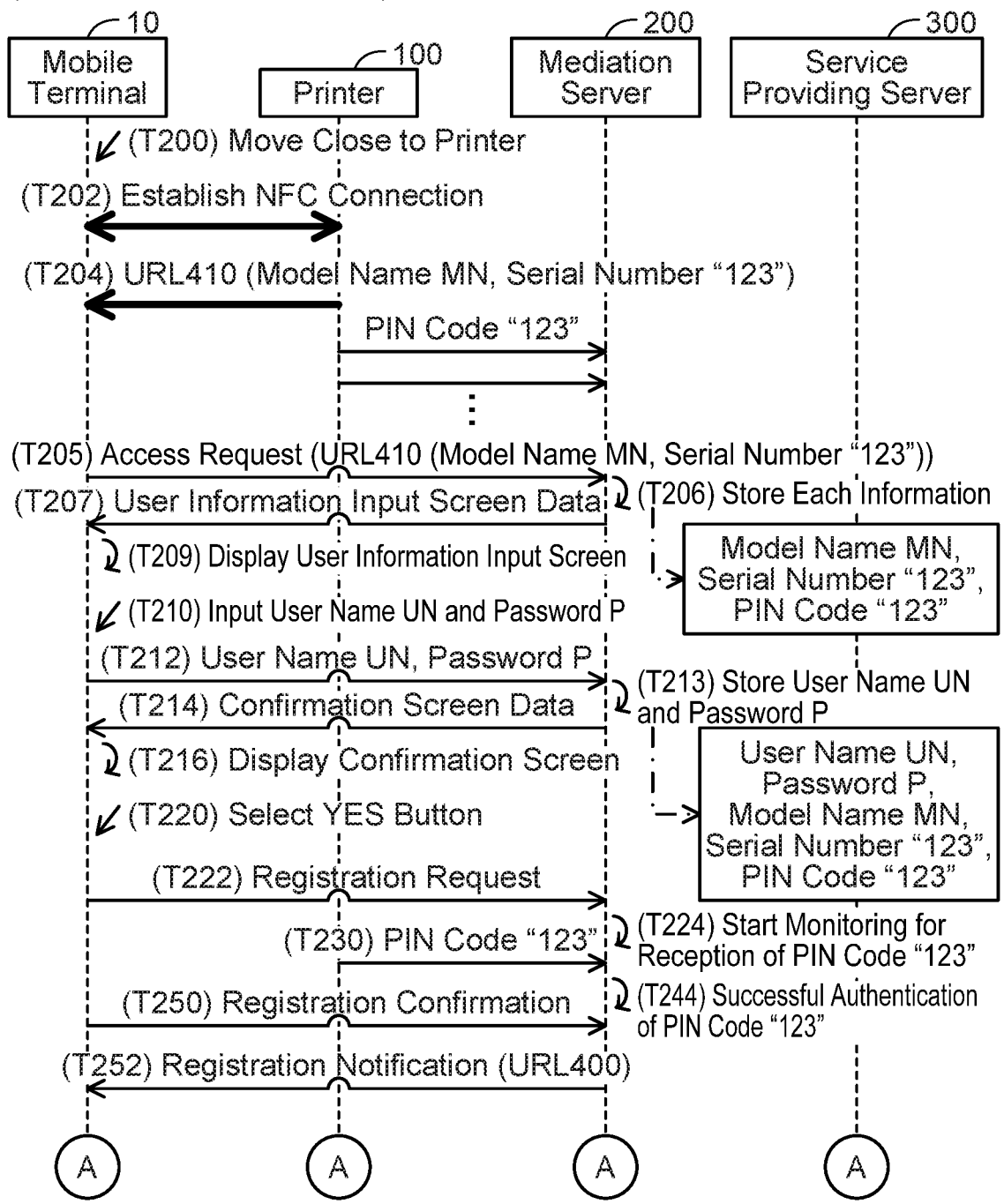
FIG. 4 shows a sequence diagram of Case A in which printer information is registered in a mediation server.
Figure 6:
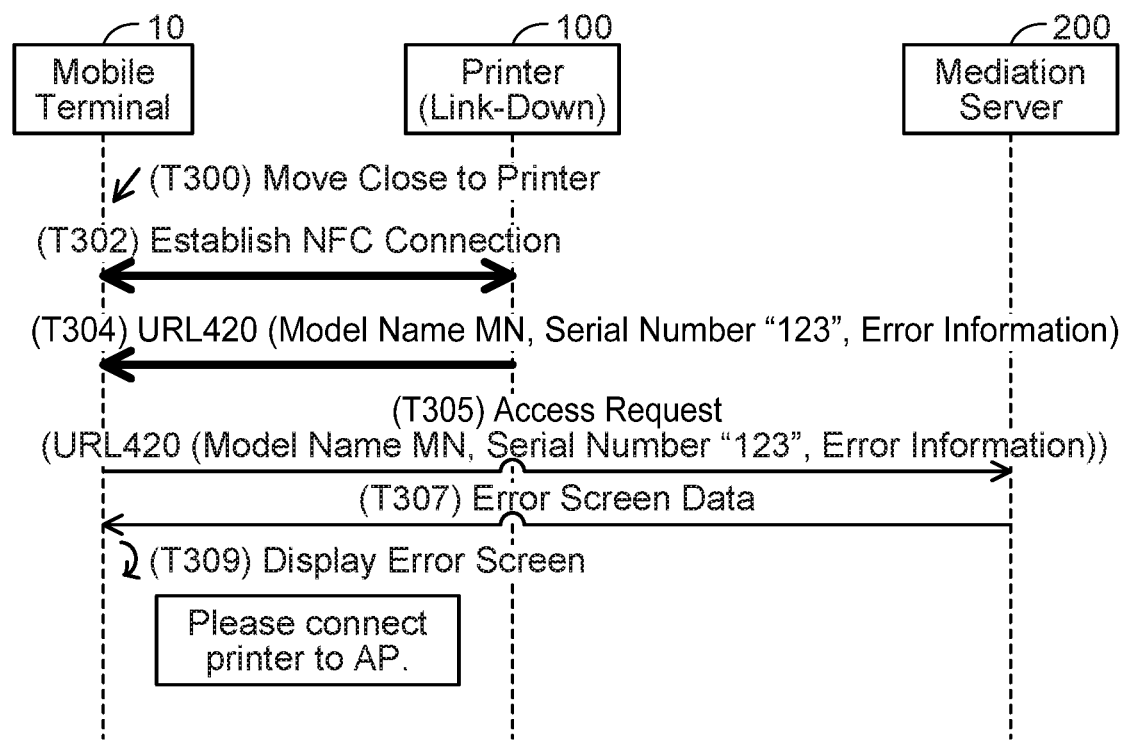
FIG. 6 shows a sequence diagram of Case B in which a printer is in a link-down state.
Figure 7:
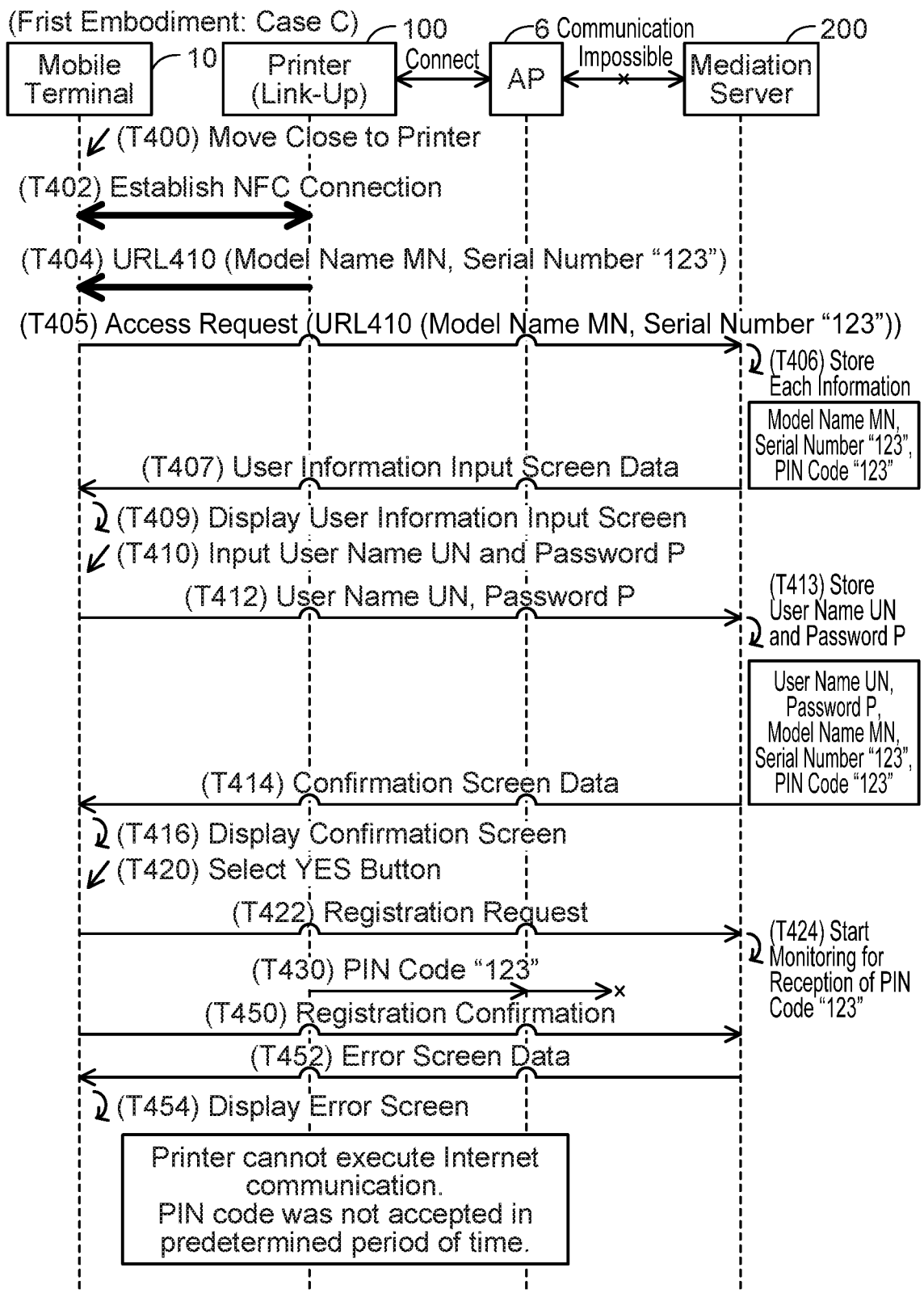
FIG. 7 shows a sequence diagram of Case C in which the printer cannot execute communication via the Internet.

(Specific Examples; FIG. 4, FIG. 6, and FIG. 7)

Next, specific examples of processes executed by the devices 10, 100, 200, 300 will be described with reference to FIG. 4, FIG. 6, and FIG. 7. Below, to facilitate understanding, the operations executed by CPUs of the devices 10, 100, 200, 300 (e.g., the CPU 32 of the mobile terminal 10, etc.) are not written with the CPUs as the subject, but with the devices (e.g., the mobile terminal 10) as the subject. Further, in FIG. 4, etc., a thick arrow between the mobile terminal 10 and the printer 100 indicates the NFC communication via the NFC I/F 18 (or 118), and a thin arrow (or dashed arrow) between the devices 10, 100, 200, 300 indicates the Wi-Fi communication.

(Case A; FIG. 4)

First, a process of Case A, in which information (i.e., the model name MN, the serial number "123") of the printer 100 is registered in the mediation server 200, will be described with reference to FIG. 4. In T200, in response to the mobile terminal 10 being moved closer to the printer 100 by the user, an NFC connection is established between the NFC I/F 18 of the mobile terminal 10 and the NFC I/F 118 of the printer 100.

In T204, the printer 100 sends a URL 410 indicating a location of the mediation server 200 to the mobile terminal 10 via the NFC I/F 118 by using the established NFC connection. The URL 410 includes a character string indicating the location of the mediation server 200, and a query character string added after the character string. The query character string includes the model name MN and the serial number "123". Further, in response to the NFC connection being established, and without accepting an operation from the user, the printer 100 prepares a PIN code "123" which is the same character string as the serial number "123", and starts repeatedly sending the PIN code "123" to the mediation server 200 via the Wi-Fi I/F 116. However, since monitoring for reception of the PIN code "123" has not been started by the mediation server 200 at this stage, authentication of the PIN code "123" does not succeed even though the PIN code "123" is received by the mediation server 200.

In T204, in response to receiving the URL 410 from the printer 100 via the NFC I/F 18, the mobile terminal 10 starts the browser program 38. The mobile terminal 10 executes the following processes in accordance with the browser program 38. In T205, the mobile terminal 10 sends an access request including the received URL 410 to the mediation server 200 via the Wi-Fi I/F 16.

In T205, in response to receiving the access request from the mobile terminal 10, the mediation server 200 acquires the model name MN and the serial number "123" from the URL 410 included in the access request, and prepares the PIN code "123" which is the same character string as the acquired serial number "123". Next, in T206, the mediation server 200 stores the model name MN, the serial number "123", and the PIN code "123" in association with one another in the memory 234. T207 to 212 are similar to T7 to T12 of FIG. 1 except that the mediation server 200 is used instead of the mediation server 201.

In response to receiving the user name UN and the password P from the mobile terminal 10 in T212, in T213 the mediation server 200 stores, in the memory 234, the user name UN and the password P in association with the information stored in T206. T214 to T222 are similar to T14 to T22 of FIG. 1 except that the mediation server 200 is used instead of the mediation server 201.

In response to receiving a registration request from the mobile terminal 10 in T222, in T224 the mediation server 200 starts monitoring for reception of the PIN code "123". As described above, the printer 100 starts repeatedly sending the PIN code "123" to the mediation server 200 in response to the execution of T202 and T204. After starting monitoring for reception of the PIN code "123" in T224, in T230 the mediation server 200 receives the PIN code "123" from the printer 100. In this case, in T244 the mediation server 200 determines that the authentication of the PIN code "123" has succeeded.

T250 and T252 are similar to T50 and T52 of FIG. 1 except that the mediation server 200 instead of the mediation server 201 is used. Then, after the process of T252 has ended, processes similar to FIG. 2 are executed using the printer 100 and the mediation server 200 instead of the printer 101 and the mediation server 201. That is, in T130 of FIG. 2 the mobile terminal 10 receives the access token AT from the service providing server 300 via the Wi-Fi OF 16 and, in T132, sends the received access token AT to the mediation server 200 via the Wi-Fi I/F 16. In T132, the mediation server 200 receives the access token AT from the mobile terminal 10 and, in T134, registers service information in the memory 234. The service information includes the user name UN, the password P, the model name MN, the serial number "123", and the access token AT. Thereby, the mediation server 200 can mediate provision of the shipping service for the printer 100.

(Effect of Case A)

As described above, in the first comparative example of FIG. 1, in order to register the service information in the mediation server 201, the user must input the model name MN and the serial number SN of the printer 101 into the device designation screen (T30), and then must input the PIN code C to the printer 101 (T40). By contrast, in Case A of FIG. 4, the mobile terminal 10 executes communication, with the printer 100, of the URL 410 including the model name MN and the serial number "123" of the printer 100 (T204 of FIG. 4), and sends the URL 410 to the mediation server 200 (T205). The mediation server 200 prepares the PIN code "123" which is the same character string as the serial number "123", and stores the model name MN, the serial number "123", and the PIN code "123" in association with one another in the memory 234 (T206). Here, the PIN code "123" (i.e., the serial number "123") is information prepared by the printer 100 without being inputted to the mobile terminal 10 or the printer 100 by the user. The mobile terminal 10 further sends the access token AT to the mediation server 200 (T132 of FIG. 2). Further, the printer 100 sends the PIN code "123" having the same character string as the serial number "123" to the mediation server 200 (T230). In a case where the PIN code "123" (i.e., the serial number "123") is received from both the mobile terminal 10 and the printer 100 (T205, T230), and the access token AT is received from the mobile terminal 10 (T132 of FIG. 2), the mediation server 200 registers, in the memory 234, the service information including the model name MN, the serial number "123", and the access token AT (T134). Consequently, without inputting the model name MN, the serial number "123", and the PIN code "123" (i.e., the serial number "123") to the mobile terminal 10 or the printer 100, the user can easily register the service information in the mediation server 200.

Figure 5:
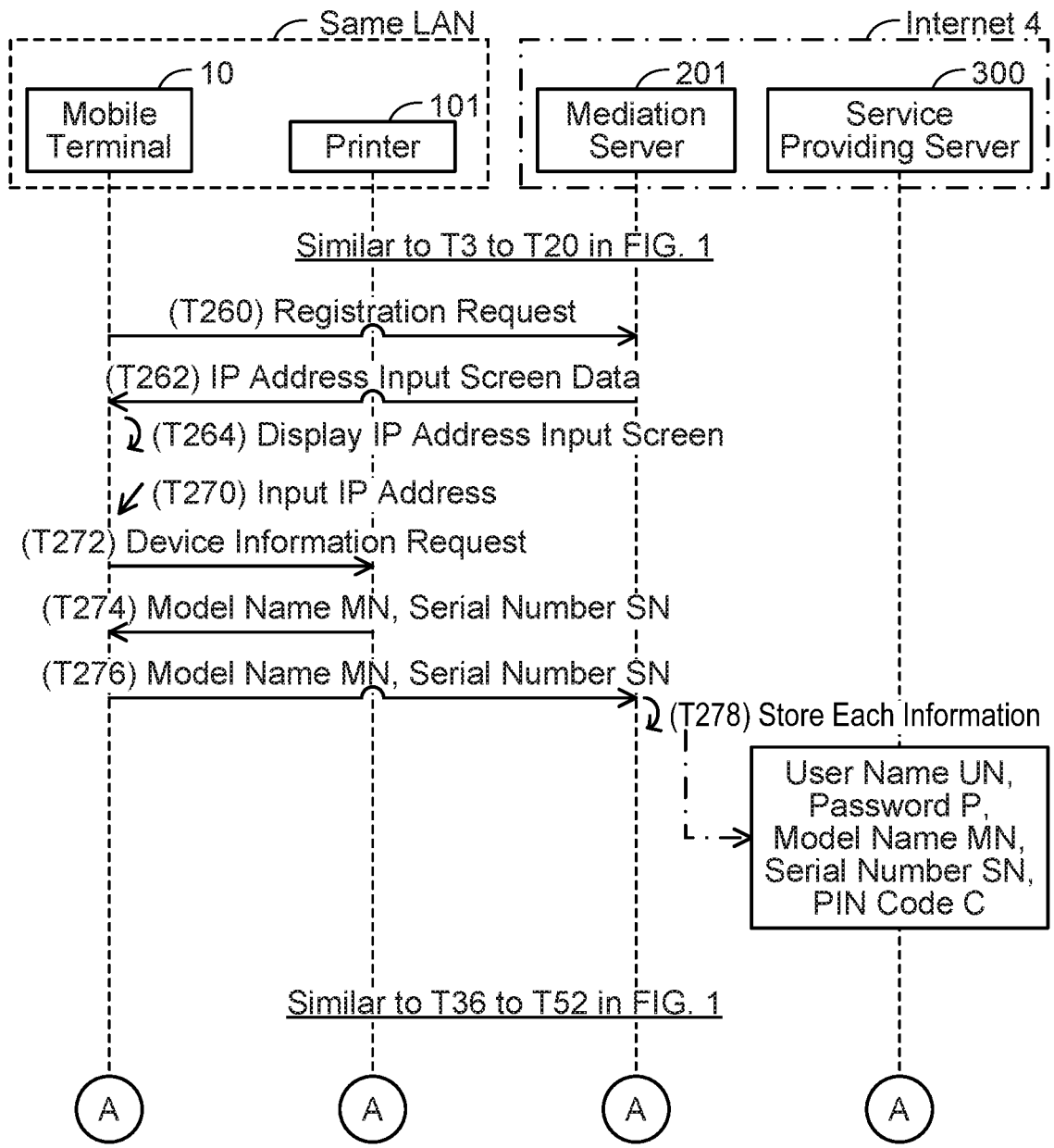
FIG. 5 shows a sequence diagram of a second comparative example.

(Second Comparative Example; FIG. 5)

As described above, in Case A of FIG. 4, the mobile terminal 10 is connected to the LAN formed by the AP 5, and the printer 100 is connected to the LAN formed by the AP 6. That is, the mobile terminal 10 and the printer 100 are not connected to the same LAN, and do not execute communication using the LAN. The mobile terminal 10 and the printer 100 use the NFC communication to execute the communication of the model name MN and the serial number "123" (T202, T204). Here, a second comparative example will be described with reference to FIG. 5. In the second comparative example, the mobile terminal 10 and the printer 101 are connected to the same AP (i.e., the same LAN).

In the second comparative example, first, processes similar to T3 to T20 of FIG. 1 are executed. In T260, the mobile terminal 10 sends a registration request to the mediation server 201. In response to receiving the registration request from the mobile terminal 10 in T260, in T262 the mediation server 201 sends IP address input screen data representing an IP address input screen to the mobile terminal 10. The IP address input screen is a screen for inputting an IP address of a printer that is the registration target.

In response to receiving the IP address input screen data from the mediation server 201 in T262, in T264 the mobile terminal 10 displays the IP address input screen. Next, in response to the IP address of the printer 101 being input by the user in the IP address input screen in T270, in T272 the mobile terminal 10 uses the LAN to send, to the printer 101, a device information request requesting sending of the model name and serial number, with the IP address inputted in T270 as the destination.

In response to receiving the device information request from the mobile terminal 10 by using the LAN in T272, in T274 the printer 101 uses the LAN to send the model name MN and the serial number SN of the printer 101 to the mobile terminal 10.

In response to receiving the model name MN and the serial number SN from the printer 101 by using the LAN in T274, in T276 the mobile terminal 10 sends the received model name MN and the serial number SN to the mediation server 201.

In response to receiving the model name MN and the serial number SN from the mobile terminal 10 in T276, in T278 the mediation server 201 creates the PIN code C, and stores the user name UN, the password P, the model name MN, the serial number SN, and the PIN code C in association with one another. Thereafter, processes similar to T36 to T52 of FIG. 1 are executed.

In the second comparative example, the model name MN and the serial number SN are sent from the printer 101 to the mobile terminal 10 by using the LAN. Consequently, without inputting the model name MN and the serial number SN to the mobile terminal 10, the user can register the service information including the model name MN and the serial number SN in the mediation server 201. However, in the second comparative example, the mobile terminal 10 and the printer 101 must be present in the same LAN. That is, user work is necessary to connect the mobile terminal 10 and the printer 101 to the same LAN. Further, in T270, user work is necessary to input the IP address of the printer 101 to the mobile terminal 10. In contrast, according to the present embodiment, the model name MN and the serial number "123" are sent from the printer 101 to the mobile terminal 10 by using the NFC communication (T204 of FIG. 4). As a result, inputting of the model name MN and the serial number "123" can be made unnecessary even without the mobile terminal 10 and the printer 100 being present in the same LAN and, further without inputting the IP address of the printer 100. That is, the user work of connecting the mobile terminal 10 and the printer 100 to the same LAN, and the user work of inputting the IP address of the printer 100 to the mobile terminal 10 are unnecessary, and user convenience is improved.

(Case B; FIG. 6)

Next, a process of Case B, in which the printer 100 is in the link-down state, will be described with reference to FIG. 6. T300 and T302 are similar to T200 and T202 of FIG. 4. In the present case, in T304 the printer 100 uses the established NFC connection to send a URL 420 including a query character string different from the query character string in the URL 410 of T204 of FIG. 4, to the mobile terminal 10 via the NFC I/F 118. In addition to the model name MN and the serial number "123", the query character string includes error information indicating that the printer 100 is in the link-down state. Further, in the present case, since the printer 100 is in the link-down state, the printer 100 does not send the PIN code "123" to the mediation server 200.

In response to receiving the URL 420 from the printer 100 via the NFC I/F 18 in T304, in T305 the mobile terminal 10 sends an access request including the received URL 420 to the mediation server 200 via the Wi-Fi I/F 16.

In response to receiving the access request from the mobile terminal 10 in T305, the mediation server 200 acquires the model name MN, the serial number "123", and the error information from the URL 420 included in the access request. By acquiring the error information, the mediation server 200 can learn that the printer 100 is in the link-down state and, in this case, does not store the information (see T206 of FIG. 4), and does not send the user information input screen data (see T209 of FIG. 4). Instead of sending the user information input screen data, in T307 the mediation server 200 sends error screen data representing an error screen to the mobile terminal 10.

In response to receiving the error screen data from the mediation server 200 via the Wi-Fi I/F 16 in T307, in T309 the mobile terminal 10 displays the error screen represented by the error screen data. The error screen includes a message indicating that the printer 100 should be connected to the AP 6. Thereby, the user can learn that the printer 100 is in the link-down state, and that the printer 100 should be connected to the AP 6. According to the present embodiment, the situation does not occur that the processes from T206 of FIG. 4 onwards are executed in spite of the printer 100 being unable send the PIN code "123" to the mediation server 200. Thus, the situation of making the user execute unnecessary operations can be prevented.

(Case C; FIG. 7)

Next, a process of Case C, in which the printer 100 cannot execute communication via the Internet 4, will be described with reference to FIG. 7. In the present case, the printer 100 is connected to the AP 6 and is in the link-up state, but the Internet relay function of the AP 6 is disabled. Thereby, the printer 100 cannot execute communication via the Internet 4.

T400 to T424 are similar to T200 to T224 of FIG. 4. After T402 and T404, the printer 100 attempts to send the PIN code "123" to the mediation server 200 via the Wi-Fi I/F 116. However, due to the Internet relay function of the AP 6 being disabled, the PIN code "123" is not relayed from the AP 6 to the mediation server 200. For this reason, after monitoring for reception of the PIN code "123" has been started in the mediation server 200 (see T424), the mediation server 200 cannot receive the PIN code "123" from the printer 100, as shown in T430.

In a case of receiving the registration confirmation from the mobile terminal 10 in T450 in the state of not having received the PIN code "123" from the printer 100, in T452 the mediation server 200 sends the error screen data representing the error screen to the mobile terminal 10.

In response to receiving the error screen data from the mediation server 200 via the Wi-Fi I/F 16 in T452, in T454 the mobile terminal 10 displays the error screen represented by the received error screen data. The error screen includes a message indicating that authentication of the PIN code did not succeed. Thereby, the user can learn that the printer 100 cannot execute communication with the mediation server 200.

(Correspondence Relationship)

The mobile terminal 10, the printer 100, the mediation server 200, and the service providing server 300 are each an example of "terminal device", "communication device", "first server", "second server", respectively. The serial number "123" is an example of "authentication information" and "device identification information". The access token AT is an example of "specific information". The NFC I/F 18 (or 118) and the Wi-Fi I/F 16 (or 116) are each an example of "first interface", "second interface", respectively.

The process of T204 of FIG. 4 (or T304 of FIG. 6, T404 of FIG. 7), the process of T205 (or T305, T405), and the process of T132 of FIG. 2 are each an example of "execute a communication of authentication information with the communication device", "send the authentication information to the first sever", "send specific information to the first server" executed by "terminal device", respectively. Further, the process of T204 of FIG. 4 (or T304 of FIG. 6, T404 of FIG. 7) and the process of T230 are each an example of "execute the communication of the authentication information with the terminal device", and "send the authentication information to the first server", executed by "communication device" respectively. Further, the process of T134 of FIG. 2 is an example of a process executed by "register the service information in the memory in a case where the authentication information is received from both of the terminal device and the communication device and the specific information is received from the terminal device" of "first server".

Figure 8:
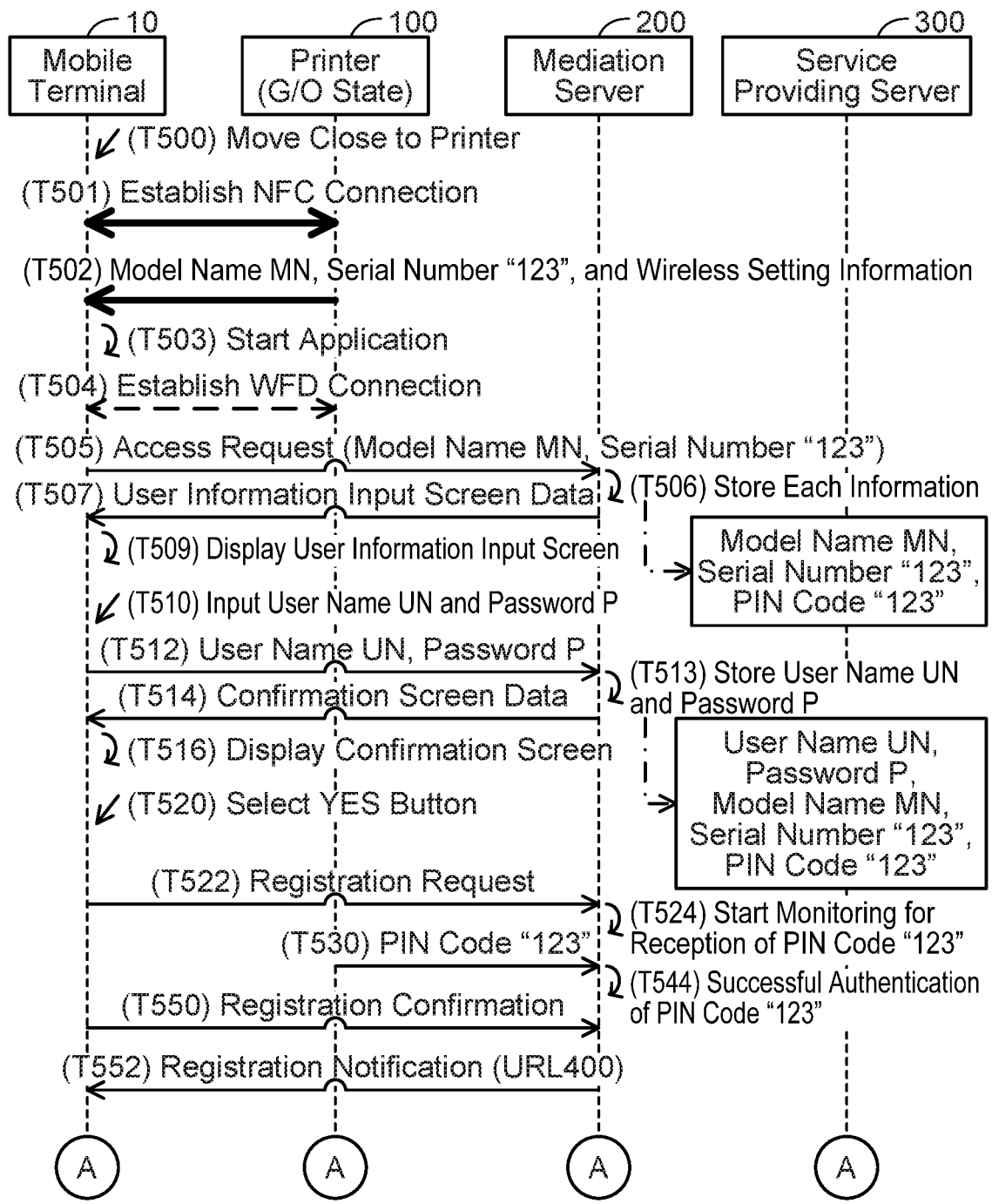
FIG. 8 shows a sequence diagram of Case D of a second embodiment
Figure 9:
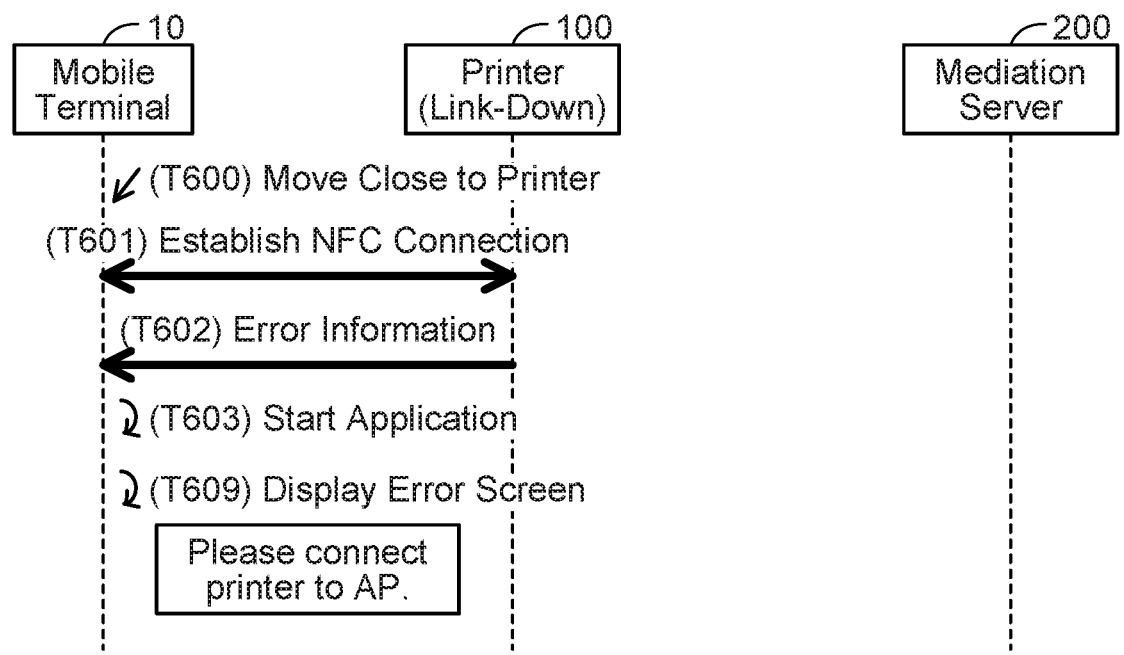
FIG. 9 shows a sequence diagram of Case E of the second embodiment.
Figure 10:
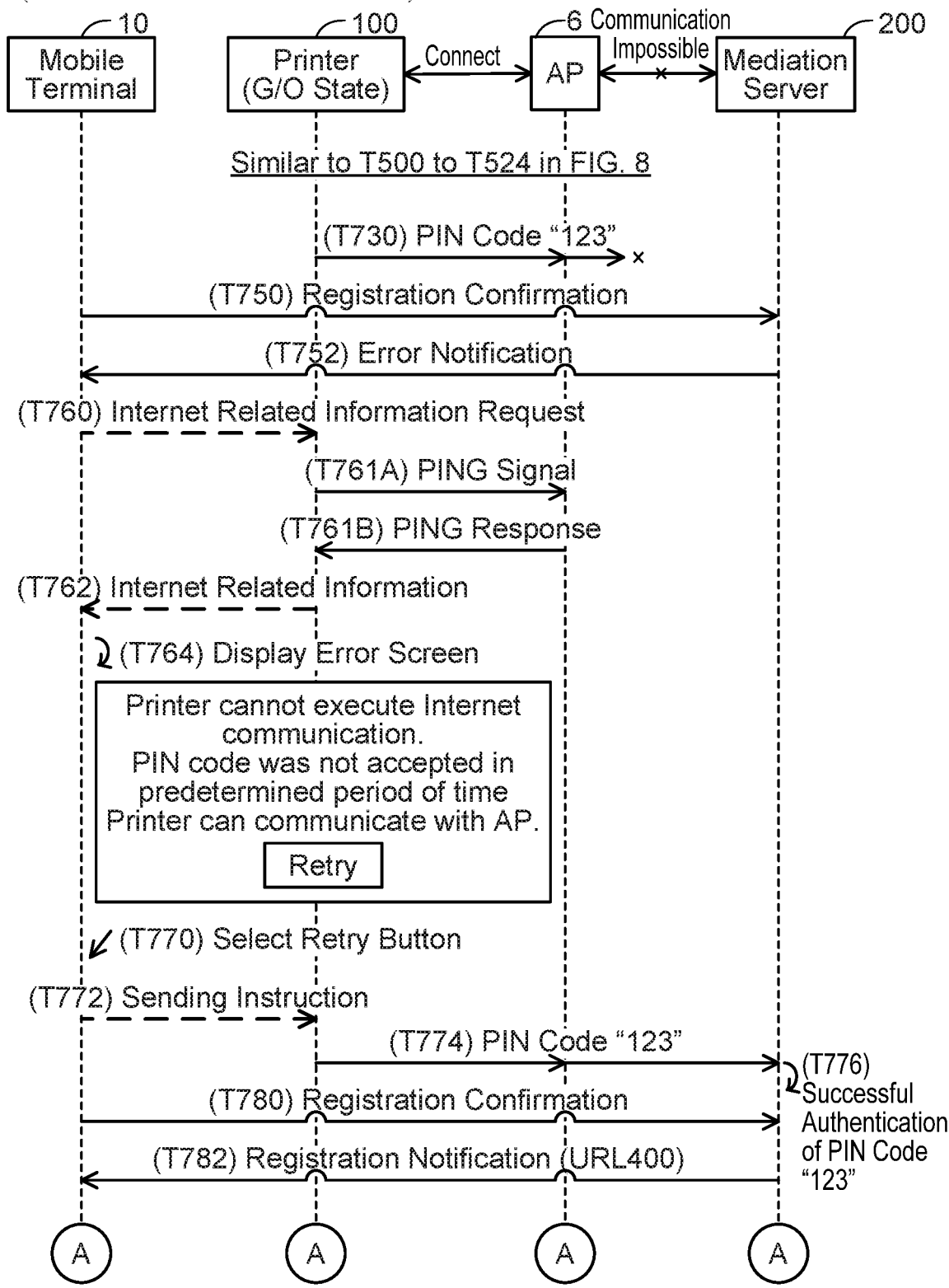
FIG. 10 shows a sequence diagram of Case F of the second embodiment.

(Second Embodiment; FIG. 8 to FIG. 10)

Next, a second embodiment will be described with reference to FIG. 8 to FIG. 10. The second embodiment differs from the first embodiment on the point of the memory 34 of the mobile terminal 10 storing a registration application 40 (see FIG. 1). Below, the registration application 40 is written simply as "application 40". The application 40 is an application provided by the vendor of the printer 100, and is a program for registering the service information in the mediation server 200.

Further, in the present embodiment, the printer 100 is operating in the G/O state. Consequently, the printer 100 can establish a wireless connection according to the WDF scheme (referred to as "WFD connection" below) with the mobile terminal 10, and form a WFD network in which the printer 100 operates as a parent station (i.e., G/O). Thereby, the printer 100 can execute communication with the mobile terminal 10 without intervention of the AP 6. Moreover, in a variant, a WFD network may be formed in which the mobile terminal 10 operates in the G/O state, and the mobile terminal 10 operates as the parent station.

(Case D; FIG. 8)

First, a process of Case D, in which information of the printer 100 (i.e., the model name MN, the serial number "123") is registered in the mediation server 200, will be described with reference to FIG. 8. T500 and T501 are similar to T200 and T202 of FIG. 4. In T502, the printer 100 uses the established NFC connection to send wireless setting information, in addition to the model name MN and the serial number "123", to the mobile terminal 10 via the NFC I/F 118. The wireless setting information is information for establishing a WFD connection with the printer 100 (e.g., SSID, password, authentication scheme, encryption scheme, etc.).

In response to receiving the model name MN, the serial number "123", and the wireless setting information from the printer 100 via the NFC I/F 18 in T502, in T503 the mobile terminal 10 starts the application 40. Thereby, the mobile terminal 10 executes the following processes in accordance with the application 40 instead of the browser program 38. In T504, the mobile terminal 10 executes various types of communication (Probe, Association, WPS Negotiation, 4-way Handshake, etc.) with the printer 100 via the Wi-Fi I/F 16 by using the received wireless setting information. As a result, the mobile terminal 10 establishes a WFD connection with the printer 100 via the Wi-Fi I/F 16. That is, the Wi-Fi I/F 16 of the mobile terminal 10 reaches a state of having established a wireless connection with the AP 5 (called "AP connection" below), and of having established the WFD connection with the printer 100. Further, the Wi-Fi I/F 116 of the printer 100 reaches a state of having established an AP connection with the AP 6, and of having established a WFD connection with the mobile terminal 10.

In T505 the mobile terminal 10 sends an access request including the received model name MN and the serial number "123" to the mediation server 200 via the Wi-Fi I/F 16 by using the AP connection. T506 to T552 are similar to T206 to T252 of FIG. 4. Then, after the process of T552 has ended, processes similar to FIG. 2 are executed using the printer 100 and the mediation server 200 instead of the printer 101 and the mediation server 201.

In the present embodiment as well, the user can easily register the service information in the mediation server 200 without inputting the model name MN, the serial number "123", and the PIN code "123" (i.e., the serial number "123") to the mobile terminal 10 or the printer 100.

(Case E; FIG. 9)

Next, a process of Case E, in which the printer 100 is in the link-down state, will be described with reference to FIG. 9. T600 and T601 are similar to T300 and T302 of FIG. 6. In the present case, in T602 the printer 100 sends error information indicating that the printer 100 is in the link-down state to the mobile terminal 10 via the NFC I/F 118 by using the established NFC connection, without sending the model name MN and the serial number "123".

In response to receiving the error information from the printer 100 via the NFC I/F 18 in T602, in T603 the mobile terminal 10 starts the application 40. In T609 the mobile terminal 10 displays, according to the application 40, an error screen in accordance with the received error information. The error screen is the same as T309 of FIG. 6.

In the present embodiment, since the error screen is displayed by using the application 40, unlike in Case B of FIG. 6, communication for displaying the error screen is not executed between the mobile terminal 10 and the mediation server 200 (i.e., T305 and T307 of FIG. 6). Consequently, processing load of the mobile terminal 10 and the mediation server 200 can be reduced.

(Case F; FIG. 10)

Next, a process of Case F, in which the printer 100 cannot execute communication via the Internet 4, will be described with reference to FIG. 10. In the present case, a situation similar to Case C of FIG. 7 is assumed.

First, processes similar to T500 to T524 of FIG. 8 are executed, and monitoring for reception of the PIN code "123" in the mediation server 200 is started. In T730 the printer 100 attempts to send the PIN code "123" to the mediation server 200 via the Wi-Fi I/F 116. However, the PIN code "123" is not sent from the AP 6 to the mediation server 200.

In a case of receiving the registration confirmation from the mobile terminal 10 in T750 without receiving the PIN code "123" from the printer 100, in T752 the mediation server 200 sends an error notification to the mobile terminal 10 indicating that the authentication of the PIN code did not succeed.

In response to receiving the error notification from the mediation server 200 via the Wi-Fi I/F 16 by using the AP connection in T752, in T760 the mobile terminal 10 sends an Internet related information request to the printer 100 via the Wi-Fi I/F 16 by using the WFD connection (see T504 of FIG. 8). The Internet related information request is a signal for requesting the sending of Internet related information related to Internet communication of the printer 100.

In response to receiving the Internet related information request from the mobile terminal 10 via the Wi-Fi I/F 116 by using the WFD connection in T760, in T761A the printer 100 sends a PING (abbreviation of Packet Internet Groper) signal to the AP 6 via the Wi-Fi I/F 116 by using the AP connection. In the present case, since the printer 100 is configured to communicate with the AP 6, in T761B the printer 100 receives a PING response from the AP 6 via the Wi-Fi I/F 116 by using the AP connection. In this case, in T762 the printer 100 uses the WFD connection to send, to the mobile terminal 10 via the Wi-Fi I/F 116, Internet related information indicating that communication with the AP 6 can be executed.

In response to receiving the Internet related information from the printer 100 in T762, in T764 the mobile terminal 10 displays the error screen by using the error notification and the Internet related information. Receiving the error notification from the mediation server 200 means that the authentication of the PIN code did not succeed in the mediation server 200. For this reason, the error screen includes a message indicating that the authentication of the PIN code in the mediation server 200 did not succeed. Further, receiving the Internet related information from the printer 100 indicating that communication with the AP 6 is possible does not mean that communication between the printer 100 and the AP 6 is impossible, but means that communication between the AP 6 and the mediation server 200 is impossible. That is, this means there is a possibility that the Internet relay function of the AP 6 is disabled or malfunctioning. Therefore, the error screen includes a message indicating that the printer 100 is configured to communicate with the AP 6. Thereby, the user can, e.g., perform work of enabling the Internet relay function of the AP 6. Thereafter, in T770 the user selects a retry button in the error screen. In this case, in T772 the mobile terminal 10 sends a sending instruction for instructing the sending of the PIN code "123" to the mediation server 200, to the printer 100 via the Wi-Fi I/F 16 by using the WFD connection.

In response to receiving the sending instruction from the mobile terminal 10 in T772 via the Wi-Fi I/F 116 by using the WFD connection, in T774 the printer 100 sends the PIN code "123" to the mediation server 200 via the Wi-Fi I/F 116 by using the AP connection.

In response to receiving the PIN code "123" from the printer 100 in T774, in T776 the mediation server 200 determines that the authentication of the PIN code "123" succeeded. T780 and T782 are similar to T50 and T52 of FIG. 1.

In the present case, in a case of receiving the error notification from the mediation server 200 (T752), the mobile terminal 10 receives the Internet related information from the printer 100 by using the WFD connection (T762), and displays the error screen (T764). For example, in the error screen of Case C of FIG. 7 (see T454), the user cannot know, by merely looking at the error screen, whether the problem is occurring in the communication between the printer 100 and the AP 6, or the communication between the AP 6 and the mediation server 200. In contrast, in the present case, since the error screen includes a message indicating that the printer 100 can execute communication with the AP 6, the user can learn that the problem is occurring in the communication between the AP 6 and the mediation server 200, and e.g., can perform the work of enabling the Internet relay function of the AP 6.

Further, unlike Case F described above, the phenomenon may occur in which, even when the printer 100 sends a PING signal to the AP 6 in T761A, the printer 100 does not receive a PING response from the AP 6. For example, this type of phenomenon may occur in a case where a gateway address of the printer 100 (i.e., an IP address of the AP 6) is not set correctly. In this case, in T762 the printer 100 sends the Internet related information to the mobile terminal 10 indicating that the printer 100 is incapable of executing communication with the AP 6.

Upon receiving the Internet related information from the printer 100 indicating that it is incapable of executing communication with the AP 6 in T762, in T764 the mobile terminal 10 displays the error screen including a message indicating that the printer 100 is incapable of executing communication with the AP 6. Thereby, the user can learn that the printer 100 is incapable of executing communication with the AP 6, e.g., can learn there is a possibility that the gateway address of the printer 100 is not set correctly. For this reason, the user can perform work of correcting the gateway address of the printer 100.

In the present embodiment, the process of T204 of FIG. 4 (or T304 of FIG. 6, T404 of FIG. 7, the process of T205 (or T305, T405), and the process of T132 of FIG. 2 are each an example of "execute a communication of authentication information with the communication device", "send the authentication information to the first sever", send specific information to the first server" of the terminal device, respectively.

(Variant 1) A PIN code having a character string different from the serial number "123" of the printer 100 may be used. In this case, e.g., the printer 100 creates a PIN code "xxx" having a unique character string in response to the NFC connection being established with the mobile terminal 10 in T202 of FIG. 4 and, in T204, sends the URL 410 that further includes the PIN code "xxx" as the query character string to the mobile terminal 10 via the NFC I/F 118 by using the established NFC connection. Further, the printer 100 starts repeatedly sending the PIN code "xxx" to the mediation server 200 via the Wi-Fi I/F 116. Then, in T205, the URL 410 is sent from the mobile terminal 10 to the mediation server 200 and, in T206, the model name MN, the serial number "123", and the PIN code "xxx" in the URL 410 are stored in association with one another in the memory 234 in the mediation server 200. According to this variant as well, the user can easily register the service information in the mediation server 200 without inputting the PIN code "xxx" to the mobile terminal 10 or the printer 100. In the present variant, the PIN code "xxx" is an example of "authentication information". Further, "authentication information" may not include "device identification information". Further, in another variant, in T204 the printer 100 may encrypt the serial number "123" to create encryption data, and send the URL 410 that further includes the encryption data as the query character string to the mobile terminal 10 via the NFC I/F 118. In this case, the printer 100 starts repeatedly sending the encryption data to the mediation server 200 via the Wi-Fi I/F 116. In the present variant, the encryption data is an example of "authentication information".

(Variant 2) In the above embodiments, the PIN code "123" having the same character string as the serial number "123" of the printer 100 was used. However, in a variant, a PIN code having the same character string as a serial number of the mobile terminal 10 (e.g., "yyy") may be used. In this case, e.g., in response to the NFC connection with the printer 100 being established in T501 of FIG. 8, the mobile terminal 10 (i.e., the application 40) sends the serial number "yyy" of the mobile terminal 10 to the printer 100 via the NFC I/F 18 by using the established NFC connection. In response to receiving the serial number "yyy" from the mobile terminal 10 via the NFC I/F 118, the printer 100 prepares a PIN code "yyy" having the same character string as the serial number "yyy" and, in T530, sends the PIN code "yyy" to the mediation server 200 via the Wi-Fi I/F 116. Then, in T505, the serial number "yyy" is sent from the mobile terminal 10 to the mediation server 200 and, in T506, the model name MN, the serial number "123", and the PIN code "yyy" are stored in association with one another in the memory 234 in the mediation server 200. That is, "communication of authentication information" may be executed by "authentication information" being sent from "terminal device" to "communication device". Further, in the present variant, before sending the serial number "yyy" of the mobile terminal 10 to the printer 100, the mobile terminal 10 may send the PIN code "yyy", which is identical to the serial number "yyy", to the mediation server 200 triggered by starting the application 40. Thereafter, in response to the NFC connection with the printer 100 being established, the mobile terminal 10 may send the serial number "yyy" (i.e., the PIN code "yyy") to the printer 100. That is, in the process to "send the authentication information to the first sever" of "terminal device", the authentication information may be sent to the first server before the communication of the authentication information is executed with the communication device.

(Variant 3) The mediation server 200 and the service providing server 300 may be the same server. In this case, in T212 of FIG. 4 e.g., the mobile terminal 10 sends the user name UN, the password P, the consumable article model number "0001", and the shipping address AD to the mediation server 200 via the Wi-Fi I/F 16. As a result, in T213 the mediation server 200 registers, in the memory 234, service information in which the user name UN, the password P, the model name MN, and the serial number "123" are associated with one another. In the present variant, "first server" and "second server" are the same server. Further, the user name UN and the password P are an example of "specific information", and "specific information" may not include token information.

(Variant 4) In the above embodiments, the serial number "123" was used as the information for identifying the printer 100. However, e.g., a MAC address or the like of the printer 100 may be used. That is, "device identification information" may be any information for identifying "communication device".

(Variant 5) The mobile terminal 10 may not receive the error information from the printer 100 in T304 of FIG. 6. In this case, in T305 the mobile terminal 10 sends an access request that does not include the error information, to the mediation server 200. As a result, processes similar to T406 to T424 and T450 to T454 of FIG. 7 are executed. That is, in the process to "execute the communication of the authentication information with the terminal device" of "communication device", "error information" may not be sent to "terminal device".

(Variant 6) In T204 of FIG. 4, the printer 100 may send the URL 410 to the mobile terminal 10 by using communication other than the NFC communication. The other communication may be, e.g., infrared communication, Bluetooth (registered trademark) communication, Transfer Jet (registered trademark) communication, etc. That is, "first interface" is not restricted to an interface for executing the NFC communication.

(Variant 7) The mobile terminal 10 may comprise, instead of the Wi-Fi I/F 16, an I/F for executing wireless communication according to a cellular scheme (e.g., 3G scheme, 4G scheme etc.). In this case, the mobile terminal 10 may not be connected with the LAN formed by the AP 5, and the processes of the above embodiments are executed according to cellular scheme wireless communication. That is, "second interface" of "terminal device" is not restricted to an interface for executing the Wi-Fi communication.

(Variant 8) The mobile terminal 10 and the printer 100 may be connected to a LAN formed by the same AP (e.g., 5) (i.e., the same LAN). In this case, in T204 of FIG. 4, the printer 100 may send the URL 410 to the mobile terminal 10 via the said LAN. In the present variant, "first interface" can be omitted.

(Variant 9) The printer 100 may not send the PIN code "123" to the mediation server 200 in response to the NFC connection with the mobile terminal 10 being established. In this case, the printer 100 sends the PIN code "123" to the mediation server 200 e.g., in response to accepting a predetermined operation from the user for sending the PIN code "123" after the NFC connection with the mobile terminal 10 has been established. That is, in the process to "send the authentication information to the first server" of "communication device", the authentication information may be sent to the first server in response to communication of the authentication information with the terminal device being executed, and an operation from the user being accepted.

(Variant 10) The processes of T514 to T522 of FIG. 8 may be omitted. In this case, in response to storing the user name UN and the password P in the memory 234 in T513, in T524 the mediation server 200 starts monitoring for reception of the PIN code "123".

The processes of FIG. 4 and FIGS. 6 to 10 are implemented by software (i.e., by the programs 36, 38, 40) in the above embodiments, however, at least one of these processes may be implemented by hardware such as a logic circuit.

What is claimed is:

1. A communication system comprising a terminal device, a communication device, and a first server, wherein
the terminal device comprises:
a processor; and
a memory storing computer-readable instructions therein, the computer-readable instructions, when executed by the processor, causing the terminal device to:
execute a communication of authentication information with the communication device, the authentication information being for registering service information in the first server and being prepared by the terminal device or the communication device without being inputted in the terminal device or the communication device by a user, the service information being for receiving a service related to the communication device from a second server;
send the authentication information to the first server; and
send specific information to the first server,
the communication device comprises:
a processor; and
a memory storing computer-readable instructions therein, the computer-readable instructions, when executed by the processor, causing the communication device to:
execute the communication of the authentication information with the terminal device; and
send the authentication information to the first server, and
the first server comprises:
a processor; and
a memory storing computer-readable instructions therein, the computer-readable instructions, when executed by the processor, causing the first server to:
in a case where the authentication information is received from both of the terminal device and the communication device, and the specific information is received from the terminal device, register the service information in the memory of the first server, the service information including device identification information for identifying the communication device and the specific information.

2. A communication device comprising:
a processor; and
a memory storing computer-readable instructions therein, the computer-readable instructions, when executed by the processor, causing the communication device to:
execute a communication of authentication information with a terminal device, the authentication information being for registering service information in a first server and being prepared by the terminal device or the communication device without being inputted in the terminal device or the communication device by a user, the service information being for receiving a service related to the communication device from a second server; and send the authentication information to the first server, wherein in the first server, in a case where the authentication information is received from both of the terminal device and the communication device, and specific information is received from the terminal device, the service information is registered, the service information including device identification information for identifying the communication device and the specific information.

3. The communication device as in claim 2, wherein
in response to executing of the communication of the authentication information with the terminal device, the authentication information is sent to the first server without accepting a user operation.

4. The communication device as in claim 2, wherein
the second server is configured separately from the first server, and
the specific information includes token information for the first server to communicate with the second server.

5. The communication device as in claim 2, wherein
the communication of the authentication information with the terminal device is executed by sending the authentication information to the terminal device.

6. The communication device as in claim 5, wherein
the authentication information is sent to the terminal device in a case where the communication device is being connected to a network, and
the computer-readable instructions, when executed by the processor, further cause the communication device to:
in a case where the communication device is not being connected to a network, send error information to the terminal device, the error information being different from the authentication information and indicating that the communication device is not being connected to a network.

7. The communication device as in claim 5, wherein
the authentication information includes the device identification information.

8. The communication device as in claim 5, wherein
a Uniform Resource Locator (URL) including the authentication information is sent to the terminal device, the URL indicating a location of the first server.

9. The communication device as in claim 2, further comprising:
a first interface configured to execute a wireless communication according to a Near Field Communication (NFC) scheme; and
a second interface being different from the first interface,
wherein the communication of the authentication information with the terminal device is executed via the first interface, and
the authentication information is sent to the first server via the second interface.

10. A non-transitory computer-readable recording medium storing computer-readable instructions for a terminal device,
wherein the computer-readable instructions, when executed by a processor of the terminal device, cause the terminal device to:
execute a communication of authentication information with a communication device, the authentication information being for registering service information in a first server and being prepared by the terminal device or the communication device without being inputted in the terminal device or the communication device by a user, the service information being for receiving a service related to the communication device from a second server;
send the authentication information to the first server; and
send specific information to the first server, and
wherein in the first server, in a case where the authentication information is received from both of the terminal device and the communication device, and the specific information is received from the terminal device, the service information is registered, the service information including device identification information for identifying the communication device and the specific information.

11. The non-transitory computer-readable recording medium as in claim 10, wherein
the authentication information is sent to the first server after the communication of the authentication information with the communication device has been executed.

12. The non-transitory computer-readable recording medium as in claim 10, wherein
the second server is configured separately from the first server, and
the specific information includes token information for the first server to communicate with the second server.

13. The non-transitory computer-readable recording medium as in claim 10, wherein
the communication of the authentication information with the communication device is executed by receiving the authentication information from the communication device.

14. The non-transitory computer-readable recording medium as in claim 13, wherein
the authentication information is received from the communication device in a case where the communication device is being connected to a network, and
the computer-readable instructions, when executed by the processor, further cause the terminal device to:
in a case where the communication device is not being connected to a network, receive error information from the communication device, the error information being different from the authentication information and indicating that the communication device is not being connected to a network; and
in a case where the error information is received from the communication device, cause a display unit of the terminal device to display an error screen represented by the error information.

15. The non-transitory computer-readable recording medium as in claim 10, wherein
the first server is located on the Internet,
when the communication of the authentication information with the communication device is executed, a communication of wireless setting information with the communication device is further executed, the wireless setting information being for establishing a wireless connection with the communication device, and
the computer-readable instructions, when executed by the processor, further cause the terminal device to:
after the communication of the wireless setting information has been executed with the communication device, establish a wireless connection with the communication device by using the wireless setting information;
in a case where the communication device is incapable of executing a communication using the Internet, receive Internet related information being related to an Internet communication of the communication device from the communication device by using the wireless connection; and in a case where the Internet related information is received from the communication device, cause a display unit of the terminal device to display a communication impossible screen by using the Internet related information, the communication impossible screen indicating that the communication device is incapable of executing an Internet communication.

16. The non-transitory computer-readable recording medium as in claim 10, wherein the authentication information includes the device identification information.

17. The non-transitory computer-readable recording medium as in claim 10, wherein the communication of the authentication information with the communication device is executed via a first interface of the terminal device, the first interface being configured to execute a wireless communication according to a Near Field Communication (NFC) scheme, and the authentication information is sent to the first server via a second interface of the terminal device, the second interface being different from the first interface.

* * * * *